May 27, 1952 M. SHUKITES 2,598,140
AUTOMATIC HOOK-SETTING FISHING LINE FLOAT
Filed June 19, 1950
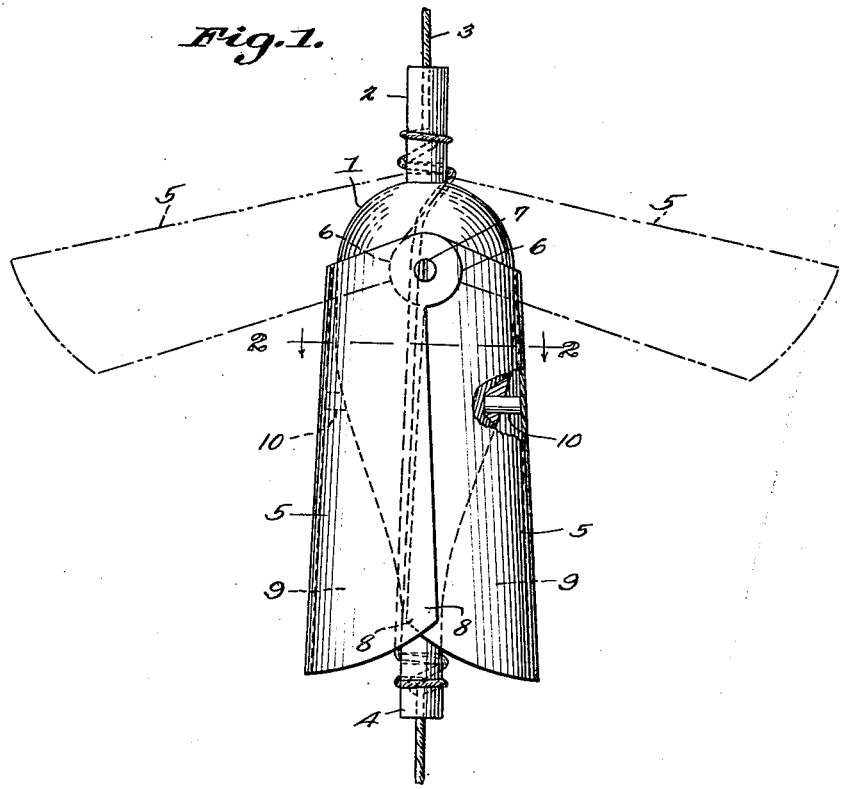
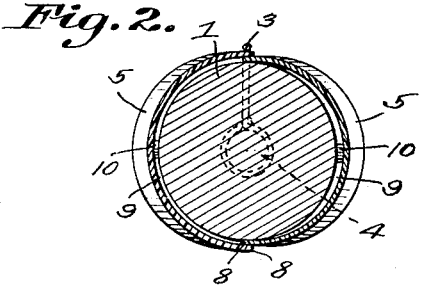
Michael Shukites
INVENTOR
BY C. A. Snow & Co.
ATTORNEYS.

Patented May 27, 1952

2,598,140

UNITED STATES PATENT OFFICE 2,598,140

AUTOMATIC HOOK SETTING FISHING LINE FLOAT

Michael Shukites, Johnston City, Ill.

Application June 19, 1950, Serial No. 168,945

1 Claim. (Cl. 43—43.1)

This invention relates to an automatic hook setting fishing line float.

When one is fishing with a float on his line, he is required to jerk the line at just the proper moment, in order to set the hook effectively within the fish's mouth and thus hook the fish securely. This is difficult to do, and it often happens that one will jerk the line too soon, or too late.

An important object of the present invention is to provide a float construction which automatically sets the hook in the fish's mouth when the fish jerks the float under the water surface, by setting up a braking action suddenly, responsive to the pull of the fish tending to submerge the float.

Another important object is to provide a float construction as described which will permit one to fish with several lines at one time, each with its own float, with assurance that any fish pulling one of the floats under will be hooked securely in the event there is a slight delay in reaching the particular line.

Another important object is to provide a float construction of the character stated which will have the advantage of permitting one to fish with the float disposed a substantial distance away from him, as distinguished from the situation as it obtains at present, wherein it is difficult to gauge properly the time for jerking the line to set the hook in the fish's mouth, when the float is far away.

Yet another object is to provide a float construction of the character stated that will be inexpensive, durable, and will be capable of adjustment.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Fig. 1 is a side elevational view of a float formed in accordance with the invention, part being sectioned away, the dotted lines showing the operative or braking position of the spreadable wings.

Fig. 2 is a section on line 2—2 of Fig. 1.

Referring to the drawings in detail, the float includes a body 1 which can be of any of the various shapes or designs commonly used in float construction, the tear-drop shape illustrated being purely illustrative of one type of float to which the invention is capable of application.

Considering the particular float, the body 1 has formed at one end thereof the stem 2 around which is wound the line 3, the line 3 passing downwardly along the surface of the body 1 and longitudinally thereof, to the tapered end 4 of said body, so as to effectively secure the fishing line to opposite ends of the float, in the customary manner.

On a float formed in accordance with the present invention, there are provided a pair of pivotally mounted spreadable wings 5. The wings are identically formed, so the description for one will suffice for the other. Considering this formation of the wings, each wing is curved transversely, following the curvature of the widest or upper portion of the body 1, to which the upper end of each wing is pivotally connected. Thus, it may be noted from Fig. 1 that the diametrically opposed spreadable wings 5 are formed at their upper end with lapping ears 6, through which pass screws 7 threaded into the body 1 to provide trunnions or pivot pins on which the wings are independently swingable from the full line to the dotted line positions thereof illustrated in Fig. 1, the wings swinging outwardly from the body from their full line positions, in which they extend longitudinally of the body, to the dotted line positions, in which they extend outwardly almost in complete perpendicularity to the axis of the body 1.

In their normal or full line positions, the lower portions of the opposite side edges of the wings lap as at 8, and thus, in view of the tapering formation of the body 1, the wings and the body cooperate to define an open space extending fully around the lower end of the body 1, said space being provided by the skirt defined by the lapping wings. The open end of this space is disposed toward the hook end of the line, and the upper end of the space is substantially closed by reason of the widening of the body 1 into close spaced relationship to the upper ends of the wings 5.

Formed upon or rigidly secured in any suitable manner to the body 1 are the diametrically opposed projecting lugs 10, that comprise stops for the wings 5 limiting their inward swinging movement to their full line or normal positions. These stops are provided so as to cause the wings in their normal or inoperative positions to diverge slightly in the direction of the hook end of the line, so that the skirt defined by said wings is roughly funnel-shaped, for a purpose to be apparent.

Considering now the operation of the float, it may be readily appreciated that the float is used with the wings folded to the full line or inoperative positions thereof seen in Fig. 1.

When a fish takes the bait, he will normally nibble at the bait, slightly agitating the float, but in no way disturbing the wings 5. This initial nuzzling or nibbling of the bait by the fish should not, of course, result in the fisherman's jerking the line upwardly, since so far the fish will not have actually taken the hook in his mouth.

When, however, the fish decides to take the bait and hook in his mouth and run with it, the fish will pull the float under the surface of the water. Since the funnel-shaped open skirt, defined by the folded wings, is disposed toward the direction in which the float is being pulled, the water will instantaneously force the wings to the dotted line positions illustrated, beyond which positions they cannot move by reason of the stem 2 acting as a common stop for the upper ends of the wings when spread. This instantaneous swinging of the wings 5 to their spread position causes the transversely curved or cupped portions of the wings to be positioned in direct opposition to the movement downwardly of the float, so that an instantaneous braking action is set up, by the heavy water resistance met by the spread wings. This immediately sets the hook in the fish's mouth, and the fisherman can now pull upwardly upon the line to bring the fish out of the water.

What is claimed is:

A fishing float comprising an elongated bouyant body having a head and a tapered portion which diminishes in diameter as it recedes from the head, said body having axial extensions at opposite ends thereof to which a fishing line is adapted to be attached, transversely concavo-convex wings mounted on the head to swing about a common axis which lies perpendicular to the longitudinal axis of the body from a position substantially encircling the body to a position at an angle to the body, and stop pins carried by the body and projecting from the sides thereof in spaced relation to the common axis for engagement with the wings to hold the portions of the wings remote from the head in spaced relation to the tapered portion of the body.

MICHAEL SHUKITES.

REFERENCES CITED

The following references are of record in the file of this patent:

UNITED STATES PATENTS

| Number | Name | Date |
|---|---|---|
| 458,129 | Papin | Aug. 18, 1891 |
| 843,946 | Howald | Feb. 12, 1907 |
| 980,667 | Owen | Jan. 3, 1911 |
| 2,043,817 | Stuck | June 9, 1936 |
| 2,153,339 | Reeves et al. | Apr. 4, 1939 |
| 2,537,235 | Parry | Jan. 9, 1951 |
| 2,537,321 | Walton | Jan. 9, 1951 |